United States Patent
Suminski et al.

(10) Patent No.: US 11,170,442 B2
(45) Date of Patent: *Nov. 9, 2021

(54) AUCTIONING MECHANISMS FOR DARK ORDER BLOCK TRADING

(71) Applicant: NYSE Holdings LLC, Atlanta, GA (US)

(72) Inventors: Alicia Suminski, Paris (FR); Anais Fabienne Christiane Dony, Vincennes (FR)

(73) Assignee: NYSE Holdings LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/218,493

(22) Filed: Mar. 31, 2021

(65) Prior Publication Data

US 2021/0217089 A1 Jul. 15, 2021

Related U.S. Application Data

(63) Continuation of application No. 14/542,726, filed on Nov. 17, 2014, now Pat. No. 11,030,689, which is a continuation of application No. 14/191,765, filed on Feb. 27, 2014, now Pat. No. 10,304,132, which is a continuation-in-part of application No. 14/139,724, filed on Dec. 23, 2013, now Pat. No. 10,269,067.

(60) Provisional application No. 61/784,222, filed on Mar. 14, 2013, provisional application No. 61/746,486, filed on Dec. 27, 2012.

(51) Int. Cl.
 *G06Q 40/04* (2012.01)
(52) U.S. Cl.
 CPC .................................. *G06Q 40/04* (2013.01)

(58) Field of Classification Search
 CPC ...... G06Q 40/025; G06Q 40/00; G06Q 40/02; G06Q 20/10; G06Q 20/102; G06Q 20/40; G06Q 30/02; G06Q 40/04; G06Q 30/04
 USPC .......................................................... 705/37
 See application file for complete search history.

(56) References Cited

U.S. PATENT DOCUMENTS

| | | |
|---|---|---|
| 7,873,561 B1 | 1/2011 | Adcock et al. |
| 7,921,054 B2 | 4/2011 | Balabon |
| 8,271,375 B2 | 9/2012 | Mahoney et al. |
| 8,380,610 B1 | 2/2013 | Nagle et al. |
| 8,442,859 B1 | 5/2013 | Broms et al. |
| 8,620,759 B1 | 12/2013 | Virgilio et al. |
| 2006/0031157 A1 | 2/2006 | Gianakouros et al. |
| 2006/0259391 A1 | 11/2006 | Schoen et al. |
| 2008/0015974 A1 | 1/2008 | Balabon |
| 2008/0306864 A1 | 12/2008 | Foley et al. |

(Continued)

FOREIGN PATENT DOCUMENTS

WO 2010/085746 A1 7/2010

OTHER PUBLICATIONS

Johnson, K. N. (2017). Regulating innovation: High frequency trading in dark pools. Journal of Corporation Law, 42(4), 833-886. Retrieved from https://dialog.proquest.com/professional/docview/2036280484?accountid=131444. Year 2107.*

(Continued)

*Primary Examiner* — Hani M Kazimi

(74) *Attorney, Agent, or Firm* — DLA Piper LLP (US)

(57) ABSTRACT

Auctioning mechanisms adapted to improve the integrity of dark order block trading is provided.

18 Claims, 13 Drawing Sheets

(56) References Cited

U.S. PATENT DOCUMENTS

| | | |
|---|---|---|
| 2009/0024512 A1 | 1/2009 | Reid |
| 2009/0070250 A1 | 3/2009 | Adcock et al. |
| 2009/0144187 A1 | 6/2009 | Borkovec et al. |
| 2009/0210337 A1 | 8/2009 | Mahoney et al. |
| 2009/0259584 A1 | 10/2009 | Waelbroeck et al. |
| 2010/0076886 A1 | 3/2010 | Adams et al. |
| 2010/0174654 A1 | 7/2010 | Foley et al. |
| 2012/0022994 A1 | 1/2012 | Conary et al. |
| 2012/0078775 A1 | 3/2012 | Callahan |
| 2012/0246055 A1 | 9/2012 | Schlifstein et al. |
| 2013/0006828 A1 | 1/2013 | Dale et al. |
| 2013/0013487 A1 | 1/2013 | Sellberg et al. |
| 2014/0136395 A1 | 5/2014 | Dowling |
| 2014/0149273 A1 | 5/2014 | Angell et al. |
| 2015/0095209 A1 | 4/2015 | Adcock et al. |

OTHER PUBLICATIONS

Singapore Written Opinion dated Mar. 27, 2017 for corresponding Singapore Application No. 10201501404Y.
Jeffs, Luke, "Dark Pools of Liquidity Come Into the Light," Financial News, pp. 1-6, Oct. 1, 2007.
Scotti, Michael, "At Deadline," Traders Magazine, p. 1, May 1, 2007.
Wallman, Steven, "Technology Takes to Securities Trading," IEEE Spectrum, pp. 60-65, Feb. 1997.

\* cited by examiner

| Member | BUY size | BUY price | SELL price | SELL size | Member |
|---|---|---|---|---|---|
| Buy side A | 10 000 000 | 101.00 | 100.55 | 7 000 000 | Dealer B |
|  |  |  | 100.75 | 5 000 000 | Dealer C |
|  |  |  | 101.20 | 15 000 000 | Dealer D |

FIG. 3A

| Member | BUY size | BUY price | SELL price | SELL size | Member |
|---|---|---|---|---|---|
| Buy side A | 7 000 000 | 100.75 | 100.75 | 7 000 000 | Dealer B |
| Buy side A | 3 000 000 | 100.75 | 100.75 | 3 000 000 | Dealer C |

FIG. 3B

| Member | BUY size | BUY price | SELL price | SELL size | Member |
|---|---|---|---|---|---|
| Buy side B | 12 000 000 | 101.20 | 100.55 | 7 000 000 | Dealer B |
| Buy side A | 10 000 000 | 101.00 | 100.75 | 5 000 000 | Dealer C |
| Dealer B | 7 000 000 | 100.35 | 101.20 | 15 000 000 | Dealer D |
| Dealer C | 5 000 000 | 100.30 | | | |

FIG. 5A

| Member | BUY size | BUY price | SELL price | SELL size | Member |
|---|---|---|---|---|---|
| Buy side B | 7 000 000 | 101.00 | 101.00 | 7 000 000 | Dealer B |
| Buy side B | 5 000 000 | 101.00 | 101.00 | 5 000 000 | Dealer C |

FIG. 5B

| Member | BUY size | BUY price | SELL price | SELL size | Member |
|---|---|---|---|---|---|
| Buy side A | 7 000 000 | 101.00 | 101.00 | 7 000 000 | Dealer B |
| Buy side A | 3 000 000 | 101.00 | 101.00 | 3 000 000 | Dealer C |
| Buy side B | 2 000 000 | 101.00 | 101.00 | 2 000 000 | Dealer C |

| participant | order n° | Quantity | Bid | Ask | Quantity | order n° | participant |
|---|---|---|---|---|---|---|---|
| ABC | A0001 | 260.000 | 101.00 | 99.00 | 300.000 | A0002 | MLN |
| DEF | A0003 | 50.000 | 100.50 | 99.50 | 65.000 | A0006 | XYZ |
| GHI | A0005 | 60.000 | 100.20 | 99.60 | 65.000 | A0007 | RST |
| ~~JKL~~ | ~~A0009~~ | ~~50.000~~ | ~~100.00~~ | 99.70 | 220.000 | A0008 | OPQ |
|  |  |  |  | 99.80 | 50.000 | A0004 | UVW |

FIG. 8B

| participant | order n° | Quantity | Bid | Ask | Quantity | order n° | participant |
|---|---|---|---|---|---|---|---|
| ABC | A0001 | 260.000 |  |  | 300.000 | A0002 | MLN |
| GHI | A0005 | 60.000 |  |  | 220.000 | A0008 | OPQ |
| DEF | A0003 | 50.000 | midpoint |  | 65.000 | A0006 | XYZ |
|  |  |  |  |  | 65.000 | A0007 | RST |
|  |  |  |  |  | 50.000 | A0004 | UVW |

| participant | order n° | Quantity | Bid | Ask | Quantity | order n° | participant |
|---|---|---|---|---|---|---|---|
| ABC | A0001 | | | | 50.000 | A0002 | MLN |
| GHI | A0005 | | | | 50.000 | A0008 | OPQ |
| DEF | A0003 | | | midpoint | 50.000 | A0006 | XYZ |
| | | | | | 50.000 | A0007 | RST |
| | | | | | 50.000 | A0004 | UVW |

FIG. 8C

| participant | order n° | Quantity | Bid | Ask | Quantity | order n° | participant |
|---|---|---|---|---|---|---|---|
| ABC | A0001 | 260.000 | | | 116.667 | A0002 | MLN |
| GHI | A0005 | 60.000 | | | 95.333 | A0008 | OPQ |
| DEF | A0003 | 50.000 | | midpoint | 54.000 | A0006 | XYZ |
| | | | | | 54.000 | A0007 | RST |
| | | | | | 50.000 | A0004 | UVW |

FIG. 8D

AUCTIONING MECHANISMS FOR DARK ORDER BLOCK TRADING

TECHNICAL FIELD

Embodiments of the disclosure relate generally to financial trading systems and, more specifically, to auctioning mechanisms for dark order block trading.

BACKGROUND

In the finance field, dark liquidity is commonly understood to be trading volume created by orders not openly available to the public. A bulk of dark liquidity is represented by block orders facilitated away from central exchanges.

Dark order block trades allow access to a good source of liquidity, with a growing percentage of the total market volume trading via crossing networks and exchange hidden orders. A recognized advantage of dark order block trades is it can allow for buying and selling of large blocks of securities without the need to identify the side, price or size of trades or the identity of market participants engaging in such trades.

Primary concerns associated with dark order block trades are information leakage and gaming, both of which can have a significant impact on the market and result in degradation of liquidity quality. To maintain the integrity of dark order block trades and avoid significant market impact, controls must be in place to reduce the likelihood of information leakage and to minimize the potential for gaming.

Accordingly, there is a need for auctioning mechanisms adapted to improve the integrity of dark order block trading.

SUMMARY

The present disclosure provides systems, methods and apparatus for conducting an auction that comprises, for example, automatically creating an auction based on monitored activity in a financial market having a minimum fill size, transmitting a notification of the auction to a plurality of market participants, building an order book for the auction based on firm limit orders received from the plurality of market participants, identifying a reference price for conducting the auction where the reference price is calculated as a midpoint of bid and ask prices in the financial market, and filling qualifying orders received from the plurality of market participants based on the reference price.

BRIEF DESCRIPTION OF THE DRAWINGS

The present disclosure is illustrated by way of example, and not by way of limitation, and will become apparent upon consideration of the following detailed description, taken in conjunction with the accompanying drawings, in which like reference characters refer to like parts throughout, and in which:

FIGS. 3A and 3B illustrate, respectively, an order book comprising orders received from market participants, excluding orders competing with an auction initiator, and a corresponding order book comprising the resulting transaction.

FIGS. 5A-5C illustrate, respectively, an order book comprising orders received from market participants, including orders competing with an auction initiator, a corresponding order book comprising the resulting transaction in favor a competing market participant, and a corresponding order book comprising the resulting transaction in favor of the auction initiator.

FIGS. 8A-8D illustrate an order book comprising orders received from market participants and the corresponding distribution of shares in accordance with the method illustrated by the flow diagrams of FIGS. 7A-7C.

DETAILED DESCRIPTION

Figure 1:
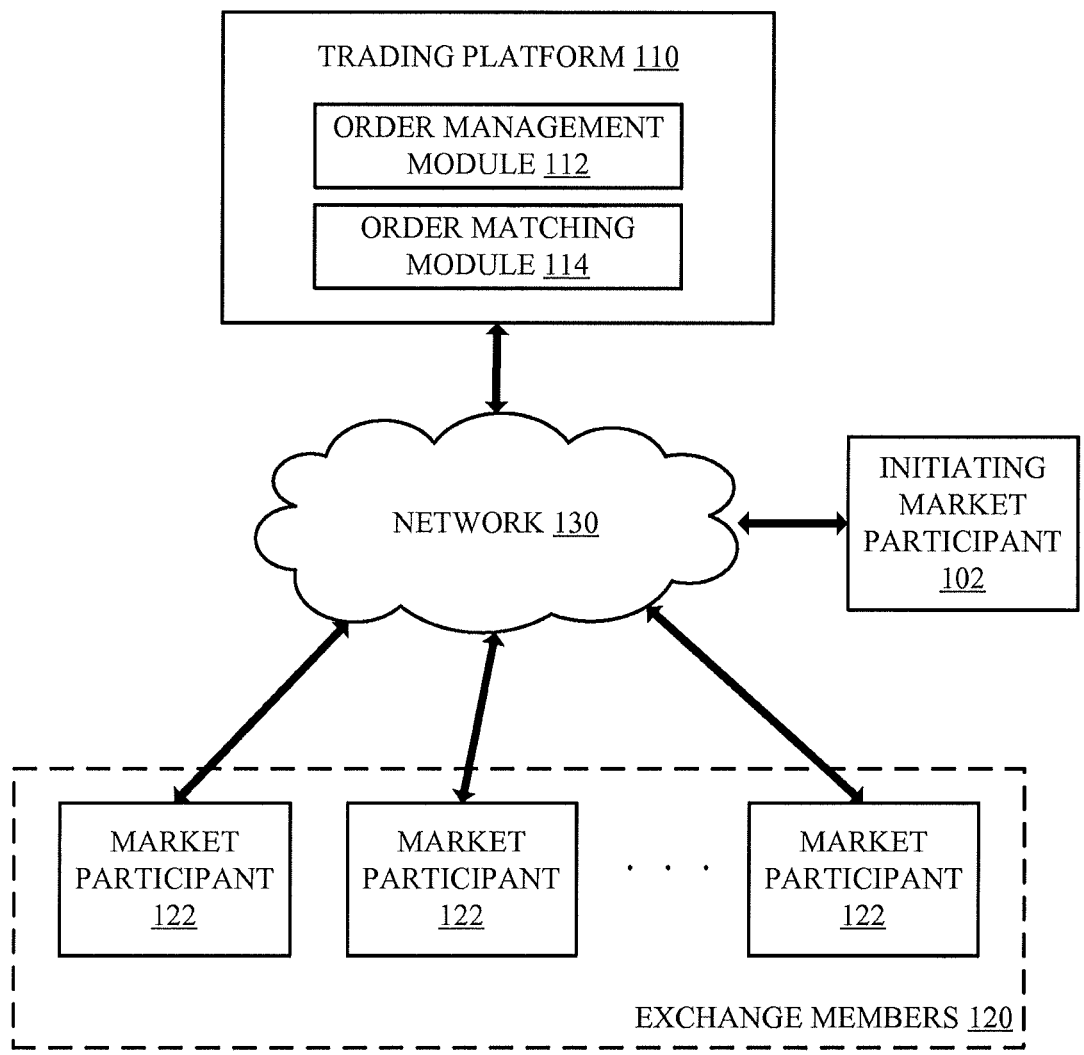
FIG. 1 is a block diagram illustrating an exemplary computer network in which embodiments of the present disclosure may operate.

Embodiments of the disclosure provide methods for conducting auctions suitable for dark order block trading.

In the following description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "receiving", "determining", "generating", "transmitting", "building", "identifying", "selecting", "executing", "filling", "canceling", "processing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will be apparent from the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

FIG. 1 is a block diagram illustrating an exemplary computer network 100 in which embodiments of the present disclosure may operate. Referring to FIG. 1, computer network 100 may be comprised of at least one trading platform 110, an initiating market participant 102 (also referred to herein as "auction initiator") and a plurality of market participants 122, which may be collectively referred to herein as exchange members 120. In one embodiment, initiating market participant 102 and each of market participants 122 may be represented by a computing device (not shown) communicatively coupled to and programmed to access trading platform 110 via a network 130. Network 130 may be a private network (e.g., a local area network (LAN), wide area network (WAN), intranet, etc.) or a public network (e.g., the Internet).

Trading platform 110 may be comprised of one or more modules configured to process block orders (buy and sell) received from initiating market participant 102 and market participants 122. For example, trading platform 110 may be comprised of an order management module 112 and an order matching module 114.

In one embodiment, order management module 112 may be configured to manage all aspects of initiating and conducting an auction in response to receiving a firm limit order from initiating market participant 102. Order management module 112 may, for example, be configured to generate a request for auction (RFA), determine the status of other pending auctions, execute various determinations to confirm whether predetermined criteria required for participating in an auction are satisfied, identify and communicate auction parameters to select market participants 122 and build an order book for conducting an auction.

In one embodiment, order matching module 114 may be configured to match orders provided in an order book built for conducting an auction initiated by order management module 112 in response to receiving a firm limit order from initiating market participant 102. Order matching module 114 may, for example, be configured to select an auction price based on orders provided in an order book, determine parameters and/or restrictions associated with the orders provided in the order book, and fill qualifying orders in accordance with the same.

Those skilled in the art will appreciate that trading platform 110 may be configured with more or less modules to conduct the auctioning methods described herein with reference to FIGS. 2A-2B, 4, 6 and 7A-7C. As illustrated in FIGS. 2A-2B, 4, 6 and 7A-7C, each of corresponding methods 200, 400, 600 and 700 may be performed by processing logic that may comprise hardware (e.g., circuitry, dedicated logic, programmable logic, microcode, etc.), software (such as instructions run on a processing device), or a combination thereof. In one embodiment, methods 200, 400, 600 and 700 may be performed by one or more processing components associated with modules 112 and 114 of trading platform 110.

Figure 2A:
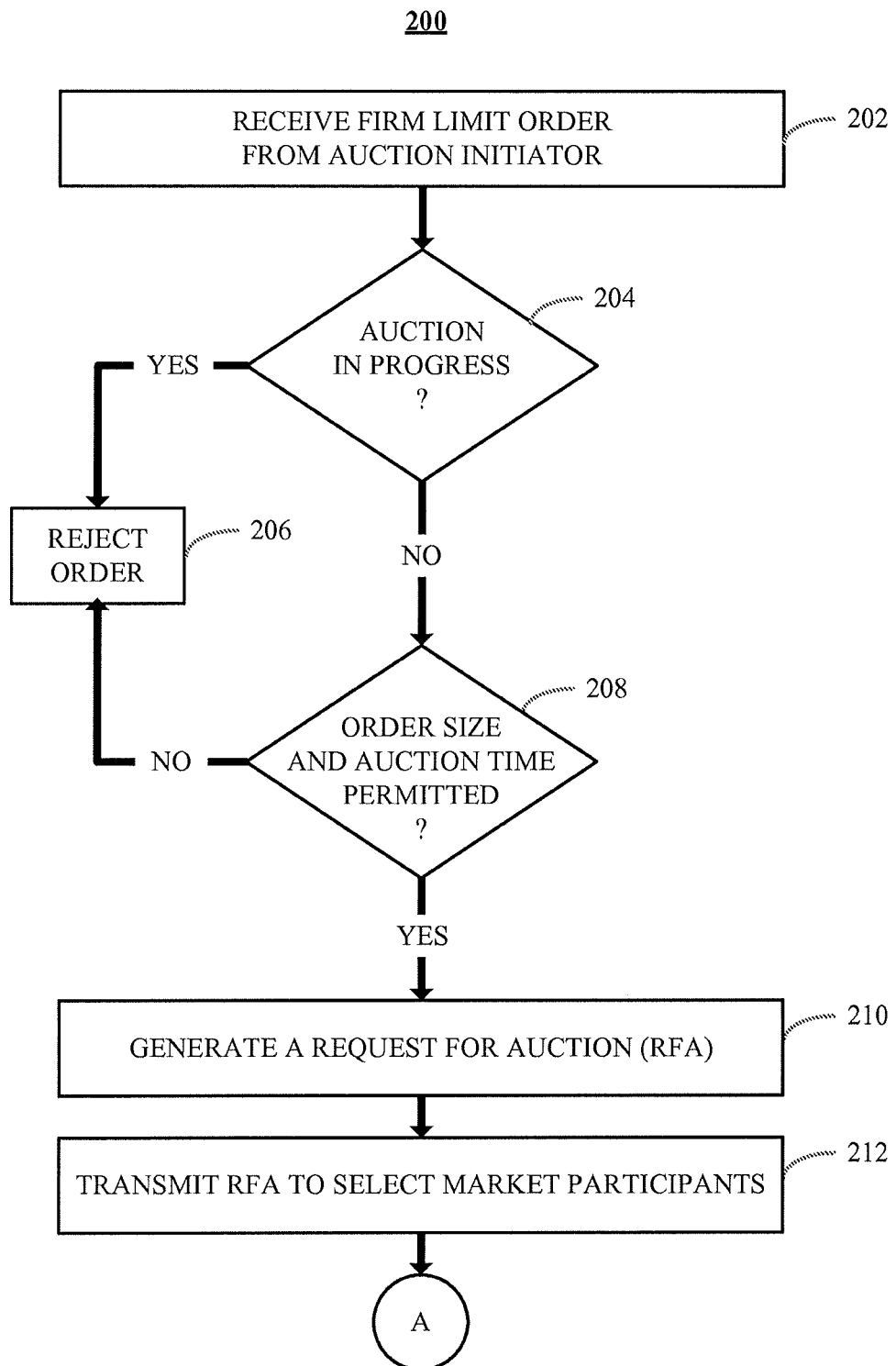
FIGS. 2A and 2B are flow diagrams illustrating an embodiment of a method for conducting an auction for block order trading.
Figure 2B:
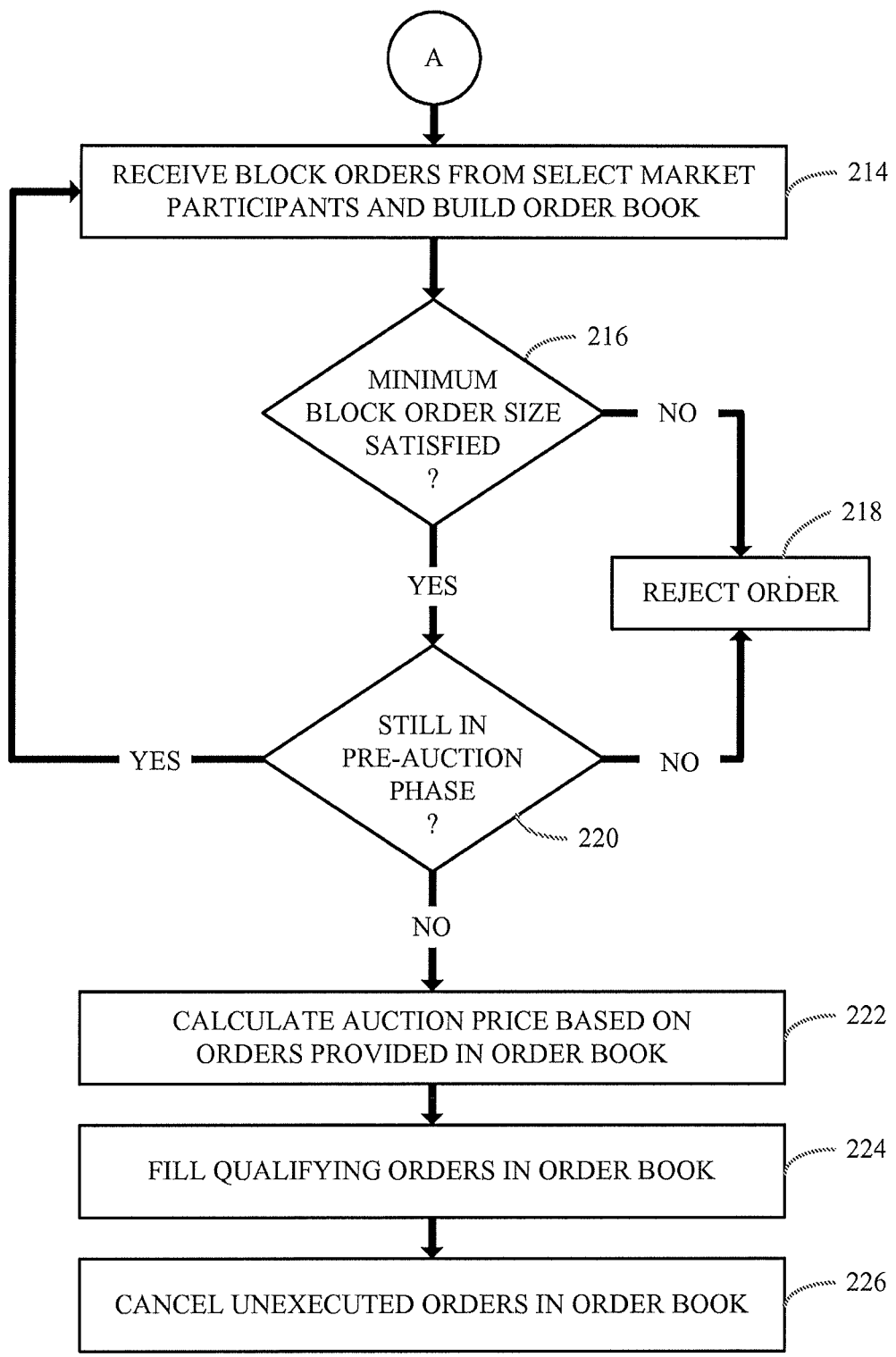

FIGS. 2A and 2B are flow diagrams illustrating a method 200 for conducting an auction for block order trading, according to an embodiment of the disclosure. Referring to FIGS. 2A and 2B, method 200 may be initiated upon receiving, at step 202, a firm limit order from an auction initiator. The firm limit offer received may be processed, for example, by order management module 112 of trading platform 110.

Upon receiving a firm limit order, an initial determination may be made, at step 204, to ascertain whether another auction is already in progress. For example, a determination may be made to ascertain if an auction in progress is related to an equity for which the auction initiator has submitted a firm limit order. If a related auction is determined to be in progress, then the firm limit order received from the auction initiator may be rejected, at step 206. A rejection notification may be generated and transmitted to the auction initiator, wherein the auction initiator may be notified of the rejected order and informed of the ongoing related auction. In providing the rejection notification, the auction initiator may be permitted to participate in the ongoing related auction. For example, the notification generated and transmitted to the auction initiator may be comprised of information communicated in an RFA associated with the ongoing related auction.

If a determination is made that a related auction is not already in progress, then the firm limit order received from the auction initiator may be subject to an additional determination, at step 208, to ascertain if order parameters (e.g., order size, auction time, etc.) for initiating an auction are satisfied. For example, to initiate an auction on trading platform 110, a minimum order size of 10,000,000 units may be required. If order parameters submitted in the firm limit order are not permitted, then the order may be rejected, at step 206, and communicated to the auction initiator.

If the determinations, at steps 204 and 208, are satisfied in favor of the firm limit order received from the auction initiator, then a corresponding RFA may be generated, at step 210. Depending on desired configuration parameters, the RFA may be generated with a limited number of order parameters. For example, in one embodiment, order management module 112 of trading platform 110 may generate a RFA comprising only the order size and time of the auction, and omit pricing information desired by the auction initiator. In another embodiment, order management module 112 of trading platform 110 may generate a RFA with no order parameters at all—e.g., in orders where a reference price is used (described in further detail herein).

After the RFA is generated, it may be transmitted, at step 212, to select market participants. Various criteria may be used to determine which market participants may receive the RFA. In one embodiment, market participants 122 already showing liquidity in a particular order book may be selected to receive the RFA. In another embodiment, market participants 122 prepared to bring liquidity may be selected to receive the RFA. In yet another embodiment, a combination of those market participants 122 already showing liquidity in a particular order book and those market participants 122 prepared to bring liquidity may be selected to receive the RFA.

It should be noted that any market participants 122 classified in exchange members 120 may send a dark block order during a pre-auction phase, even if the market participant was not a direct recipient of the RFA transmitted by order management module 112 of trading platform 110. Objective access criteria, as may be defined by order management module 112 and subject to local regulations, may be used in determining which market participants receive the RFA or are permitted to engage in the pre-auction phase.

Block orders from market participants are received, at step 214, and a corresponding order book comprising the block orders may be built for use in the auction. Similar to the firm limit order received from an auction initiator, block orders received from market participants, whether in direct or indirect response to the RFA, may be subject to one or more determinations to ascertain whether or not they are qualified to participate in the auction.

A first determination may be made, at step 216, to ascertain whether block orders received from market participants wishing to participate in the auction satisfy a predetermined minimum order size. If a minimum order size is not satisfied, the block order received from a market participant is rejected, at step 218. If the minimum order size is satisfied, then the block order received from a market participant may undergo a second determination, at step 220, to ascertain whether or not the block order was timely submitted for participation in the auction. If the time for auction has not yet been reached (also referred to as the "pre-auction phase"), block orders may continue to be received from market participants and entered into the corresponding order book.

In one embodiment, the time for auction may be a user-defined time period provided by the auction initiator when a firm limit order is submitted and received at order management module 112 of trading platform 110. In another embodiment, to preventing gaming by market participants, a random timer may be employed. The random timer may randomly adjust a user-defined time period provided by the auction initiator. More specifically, the user-defined time period provided by the auction initiator may be used as input in any one of a plurality of functions of the random timer. For instance, one function of the random timer may be configured to add or subtract a period of time (e.g., +/−15 seconds) from the user-defined time period provided by the auction initiator. For example, the auction initiator may provide for a time period of two (2) minutes. Using the aforementioned function of the random timer, which is configured to adjust by plus (+) or minus (−) fifteen (15) seconds, the actual time for auction used may be two (2) minutes and fifteen (15) seconds or one (1) minute and forty-five (45) seconds.

Upon determining, at step 220, that the auction time has been reached, block orders from market participants are rejected, at step 218, and an auction price may be determined, at step 222, based on prices associated with the orders received from market participants, as provided in the order book. In another embodiment, prices for orders received from market participants may not be needed for ascertaining the auction price. Rather, if available, a reference price may be used. A reference price may be an external price that may be determined based on market data retrieved from one or more markets. Additionally, minimum and maximum pricing thresholds may be set around the reference price to prevent gaming influencing the reference price in the main market place. The minimum and maximum pricing thresholds may be user-defined values provided by the auction initiator or may be defined automatically by the system based on the reference price observed at the time the auction initiator submits the RFA.

Once the auction price is determined, qualifying orders in the order book may be filled, at step 224, and any remaining unexecuted orders in the order book may be canceled, at step 226. Determination of the auction price and filling qualifying orders are discussed in further detail with reference to the process flows illustrated in FIGS. 4 and 6.

FIG. 3A illustrates an order book associated with an RFA initiated by a buy order received from an auction initiator, the order book comprising only corresponding sell orders received from market participants, FIG. 3B illustrates an order book comprising the resulting transaction at the time of auction based on qualifying sell orders received from the market participants, as provided in the order book illustrated in FIG. 3A.

Referring to the order book illustrated in FIG. 3A, an auction initiator ("Buy Side A") may submit an order to buy 10,000,000 units of a security (e.g., bond) at a price of $101.00 per unit. Upon receiving the order from the auction initiator, an RFA is generated and orders may be received from market participants ("Dealer B", "Dealer C" and "Dealer D") in response to the RFA. For example, as provided in the order book illustrated in FIG. 3A, a sell order of 7,000,000 units of the security is received from market participant "Dealer B" at a price of 100.55 per unit, a sell order of 5,000,000 units of the security is received from market participant "Dealer C" at a price of 100.75 per unit, and a sell order of 15,000,000 units of the security is received from market participant "Dealer D" at a price of 101.20 per unit. Orders received the market participants in response to the RFA may be sorted by order price, order size, order time or a combination thereof. As illustrated in FIG. 3A, orders received from the market participants are sorted in the order book by at least the order price.

Figure 4:
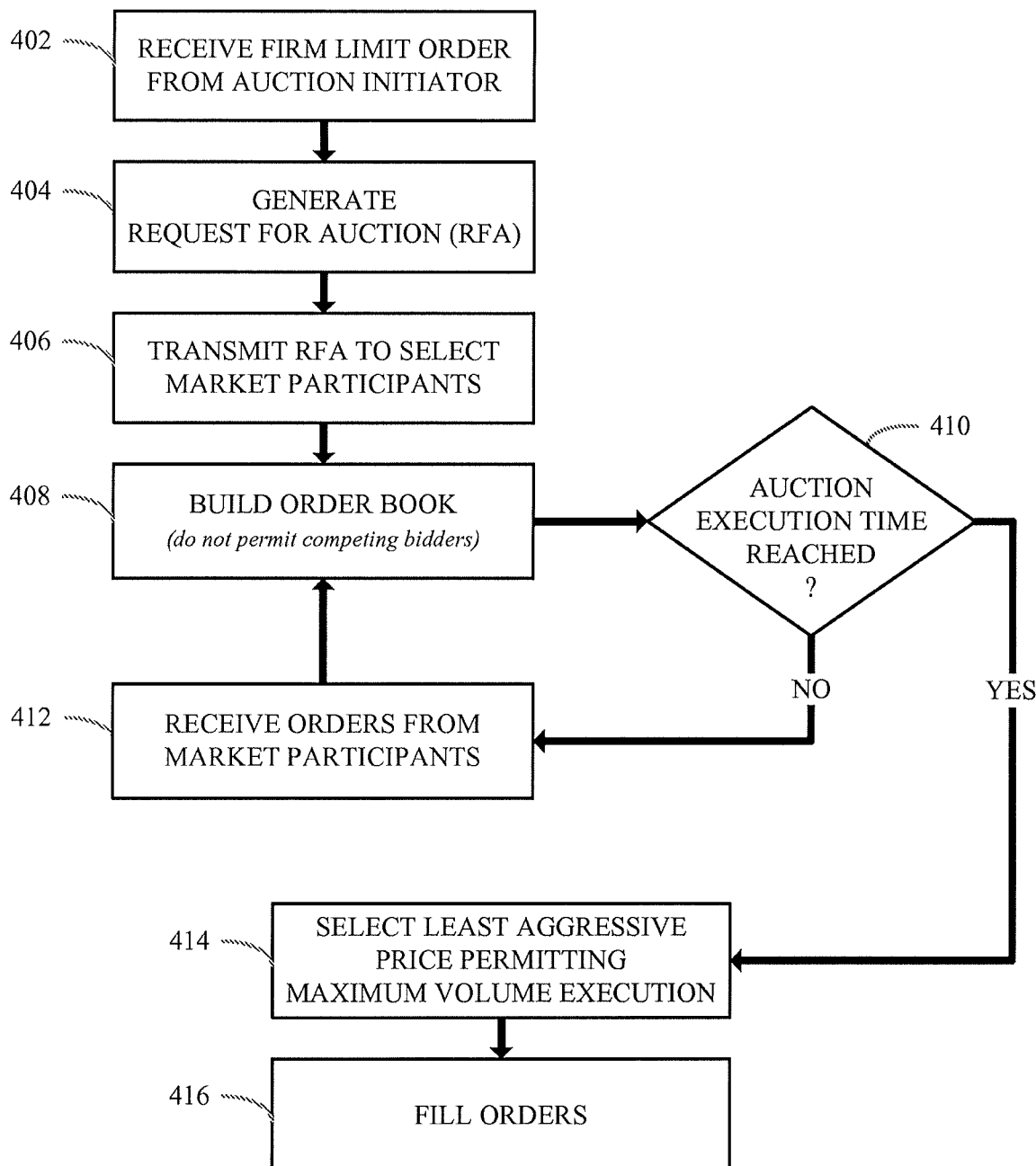
FIG. 4 is a flow diagram illustrating an embodiment of a method for conducting a partial book auction corresponding to the order books illustrated in FIG. 3A and FIG. 3B.

FIG. 4 is a flow diagram illustrating a method 400 for conducting a partial book auction corresponding to the order book illustrated in FIG. 3A. A partial book auction may only take into consideration orders received from the market participants in response to an RFA, excluding competing orders—i.e., a market participant submitting an order that competes with the firm limit order submitted by the auction initiator.

Referring to FIG. 4, method 400 may be initiated upon receiving, at step 402, a firm limit order from an auction initiator. In one embodiment, the firm limit order received from an auction initiator may be "dark"—i.e., not visible to a broader market. For example, market participants may only receive information regarding the order size and auction time identified in the firm limit order submitted by the auction initiator. Advantages of this approach may be to encourage market participants to make more aggressive orders, while at the same time minimizing occurrences of price manipulations. In another embodiment, the auction initiator may choose to allow more information associated with the firm limit order to be revealed so as to solicit the interest of more, or a particular group of, market participants.

Once the firm limit order is received, and made subject to qualifying determinations (as previously described in conjunction with FIGS. 2A-2B), an RFA may be generated, at step 404, to be transmitted, at step 406, to select market participants. As illustrated in FIG. 3A, an order book comprising the auction initiator's firm limit order and orders received from market participants in response to the RFA may be built, at step 408, and may continue to receive, at step 412, orders from market participants (excluding competing orders) until a determination is made, at step 410, that the auction time has been reached.

Upon reaching the auction time, as may be designated by the auction initiator at the time of submitting the firm limit order, an auction price for conducting the auction may be determined. Determining the auction price may take into consideration the orders received from market participants, excluding orders competing against the auction initiator, as sorted in the order book of FIG. 3A. The auction price selected, at step 414, may be determined based on the least aggressive price permitting maximum volume execution.

For example, referring to the order book in FIG. 3A, sell orders are received from market participant "Dealer B" for 7,000,000 units at $100.55 per unit, from market participant "Dealer C" for 5,000,000 units at $100.75 per unit, and from market participant "Dealer D" for 15,000,000 units at $101.20 per unit. The following table reflects the resulting buy-side volume and sell-side volume for each of the sell order prices received from market participants "Dealer B", "Dealer C" and "Dealer D".

| BUY-SIDE VOLUME | PRICE | SELL-SIDE VOLUME |
| --- | --- | --- |
| -0- | $101.20 | 27M |
| 10M | $100.75 | 12M |
| 10M | $100.55 | 7M |

The sell price of $101.20 associated with the sell order price submitted by market participant "Dealer D" exceeds the permissible buy price that the auction initiator ("Buy Side A") is willing to pay and, therefore, the sell order submitted by market participant "Dealer D" is deemed as a non-qualifying order and is not considered in determining the auction price. In view of the foregoing comparison of the buy-side and sell-side volume yielded for the sell orders remaining, the least aggressive price permitting maximum volume execution is $100.75.

After the auction price of $100.75 is selected, qualifying orders are filled, at step 416, and any remaining unfilled orders are canceled. Using qualifying sell orders from market participants sorted in the order book, as illustrated in FIG. 3A, the resulting transaction order book, as illustrated in FIG. 3B, shows sell orders associated with market participant "Dealer B" and market participant "Dealer C" filled at the selected auction price of $100.75.

FIG. 5A illustrates an order book associated with an RFA initiated by a buy order received from an auction initiator, the order book comprising competing buy orders and corresponding sell orders received from market participants. FIG. 5B illustrates an order book comprising the resulting transaction at the time of auction based on qualifying buy and sell orders received from the market participants, as provided in the order book illustrated in FIG. 5A, favoring the highest competing order received from a market participant. FIG. 5C illustrates an order book comprising the resulting transaction at the time of auction based on qualifying buy and sell orders received from the market participants, as provided in the order book illustrated in FIG. 5A, favoring the auction initiator.

Referring to the order book illustrated in FIG. 5A, an auction initiator ("Buy Side A") may submit an order to buy 10,000,000 units of a security (e.g., bond) at a price of $101.00 per unit. Upon receiving the order from the auction initiator, an RFA is generated and orders may be received from market participants ("Dealer B", "Dealer C" and "Dealer D") in response to the RFA. For example, as provided in the order book illustrated in FIG. 5A, a sell order of 7,000,000 units of the security is received from market participant "Dealer B" at a price of $100.55 per unit, a sell order of 5,000,000 units of the security is received from market participant "Dealer C" at a price of $100.75 per unit, and a sell order of 15,000,000 units of the security is received from market participant "Dealer D" at a price of $101.20 per unit.

In addition to the sell orders received from market participants, competing buy orders received after generation of the RFA, but prior to the designated auction time, may be considered and entered into the order book. For example, as provided in the order book illustrated in FIG. 5A, market participant "Buy Side B" may submit a competing buy order of 12,000,000 units of the security at a price of $101.20 per unit, market participant "Dealer B" may submit a competing buy order of 7,000,000 units of the security at a price of $100.35 per unit, and market participant "Dealer C" may submit a competing buy order of 5,000,000 units of the security at a price of $100.30 per unit.

Figure 6:
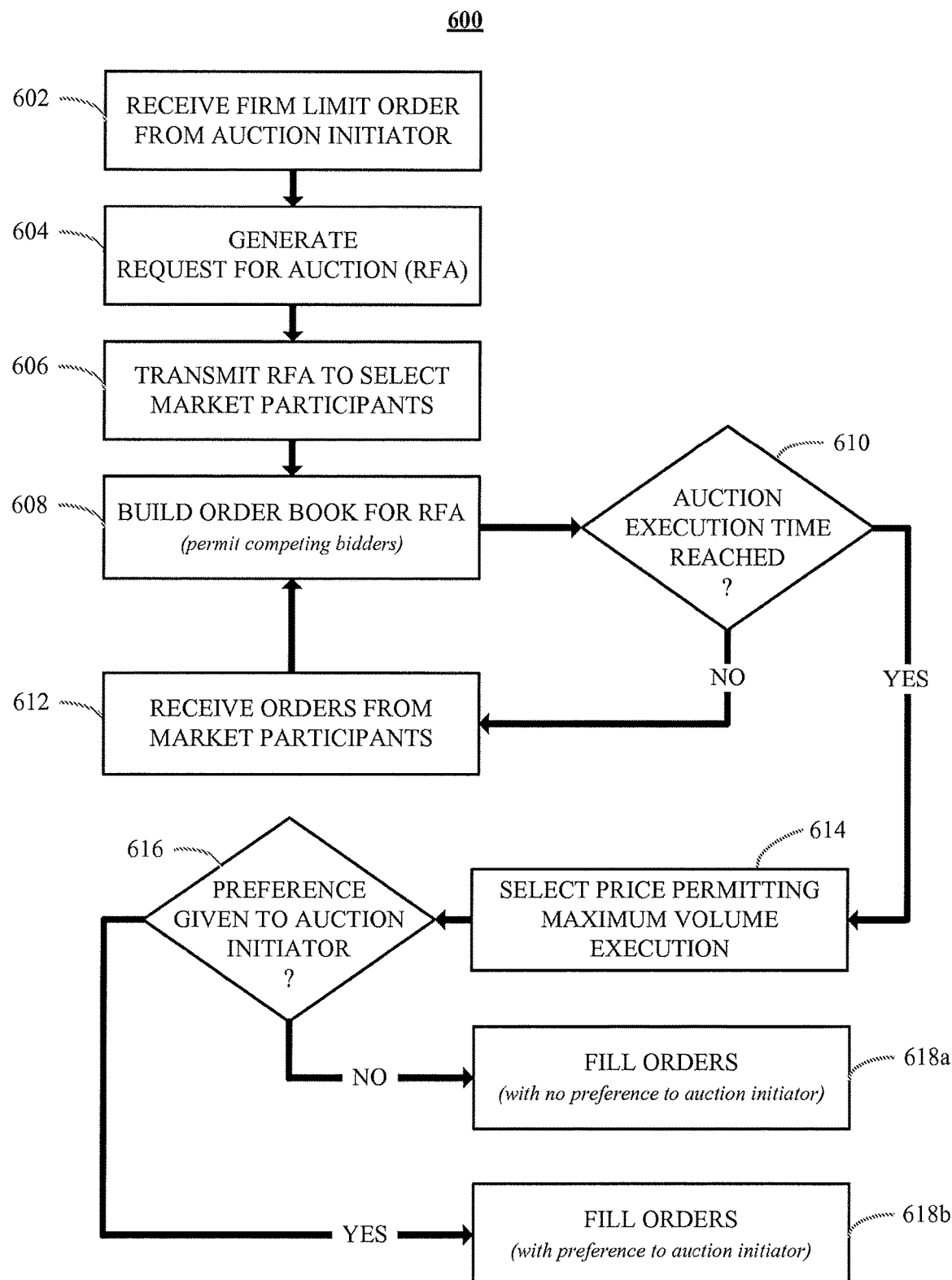
FIG. 6 is a flow diagram illustrating an embodiment of a method for conducting a full book auction corresponding to the order books illustrated in FIGS. 5A-5C.

FIG. 6 is a flow diagram illustrating a method 600 for conducting a full book auction corresponding to the order book illustrated in FIG. 5A. A full book auction may take into consideration all orders received from the market participants in response to an RFA, including competing orders—i.e., a market participant submitting an order that competes with the firm limit order submitted by the auction initiator.

Initial steps of method 600 are similar to those described in conjunction with the partial book auction in method 400 of FIG. 4. Referring to FIG. 6, method 600 may be initiated upon receiving, at step 602, a firm limit order from an auction initiator. Once the firm limit order is received, and made subject to qualifying determinations (as previously described in conjunction with FIGS. 2A-2B), an RFA may be generated, at step 604, to be transmitted, at step 606, to select market participants. As illustrated in FIG. 5A, an order book comprising the auction initiator's firm limit order and orders received from market participants in response to the RFA may be built, at step 608, and may continue to receive, at step 612, orders from market participants (including competing orders) until a determination is made, at step 610, that the auction time has been reached.

Upon reaching the auction time, an auction price for conducting the auction may be determined. Unlike the partial book auction of method 400, the full book auction of method 600 employs a different process for determining the auction price. Determining the auction price in the full book auction may take into consideration all orders (i.e., sell orders in response to the RFA and competing buy orders) received from market participants, as sorted in the order book of FIG. 5A. The auction price selected, at step 614, may be determined based on the price permitting maximum volume execution.

For example, referring to the order book in FIG. 5A, sell orders are received from market participant "Dealer B" for 7,000,000 units at $100.55 per unit, from market participant "Dealer C" for 5,000,000 units at $100.75 per unit, and from market participant "Dealer D" for 15,000,000 units at $101.20 per unit. Additionally, buy orders are received from competing market participant "Buy side B" for 12,000,000 units at $101.20, competing market participant "Dealer B" for 7,000,000 units at a price of $100.35 per unit, and competing market participant "Dealer C" for 5,000,000 units at a price of $100.30 per unit. The following table reflects the resulting buy-side volume and sell-side volume for each of the sell order and buy order prices received from all market participants "Dealer B", "Dealer C", "Dealer D", "Buy side A" and "Buy side B", irrespective of whether or not a market participant is competing with the auction initiator.

| BUY-SIDE VOLUME | PRICE | SELL-SIDE VOLUME |
| --- | --- | --- |
| 12M | $101.20 | 27M |
| 22M | $101.00 | 12M |
| 22M | $100.75 | 12M |
| 22M | $100.55 | 7M |
| 29M | $100.35 | -0- |
| 34M | $100.30 | -0- |

The buy prices of $100.35 and $100.30 associated with, respectively, the competing buy orders submitted by market participant "Dealer B" and market participant "Dealer C" result in zero sell-side volume and, therefore, these buy orders are deemed as non-qualifying orders and are not considered in determining the auction price. In view of the foregoing comparison of the buy-side volume and sell-side volume yielded for the orders remaining, the price permitting maximum volume execution is $101.00. When more than one price yields the same maximum volume, the highest price may be selected.

After the auction price of $101.00 is selected, a determination is made, at step 616, as to whether configuration parameters employed by order matching module 114 of trading platform 110 are set to give the auction initiator preference in filling orders. If no preference is given to the auction initiator, then qualifying orders may be filled, at step 618a, in favor of a competing market participant. Using qualifying orders from market participants sorted in the order book, as illustrated in FIG. 5A, the resulting transaction order book, as illustrated in FIG. 5B, shows sell orders associated with market participant "Dealer B" and market participant "Dealer C" filled at the selected auction price of $101.00 in favor of competing market participant "Buy side B", wherein competing market participant "Buy side B" is favored due to their buy order size being larger than the buy order size of auction initiator "Buy side A".

In another embodiment, where no preference is given to the auction initiator, competing market participant "Buy side B" may be favored due to their buy order price being more aggressive (i.e., higher price) than the buy order price of auction initiator "Buy side A". In yet another embodiment, where a reference price is used, rather than prices associated with orders received from market participants, the size and time (instead of the price and time) of orders received may be used to determine priority in filling orders, wherein orders may be filled in favor of a market participant having the largest order and, in those cases where order size is the same between two or more market participants, in favor of the market participant first in time.

If preference is given to the auction initiator, then qualifying orders may be filled, at step 618b, in favor of the auction initiator first. Using qualifying orders from market participants sorted in the order book, as illustrated in FIG. 5A, the resulting transaction order book, as illustrated in FIG. 5C, shows sell orders associated with market participant "Dealer B" and market participant "Dealer C" filled at the selected auction price of $101.00 first to auction initiator "Buy side A" and then with remaining units to competing market participant "Buy side B". In this embodiment, since preference is given to auction initiator "Buy side A", competing market participant "Buy Side B" only receives a partial execution on the competing buy order even though the buy order received from competing market participant "Buy Side B" is larger than the buy order received from auction initiator "Buy side A".

Figure 7A:
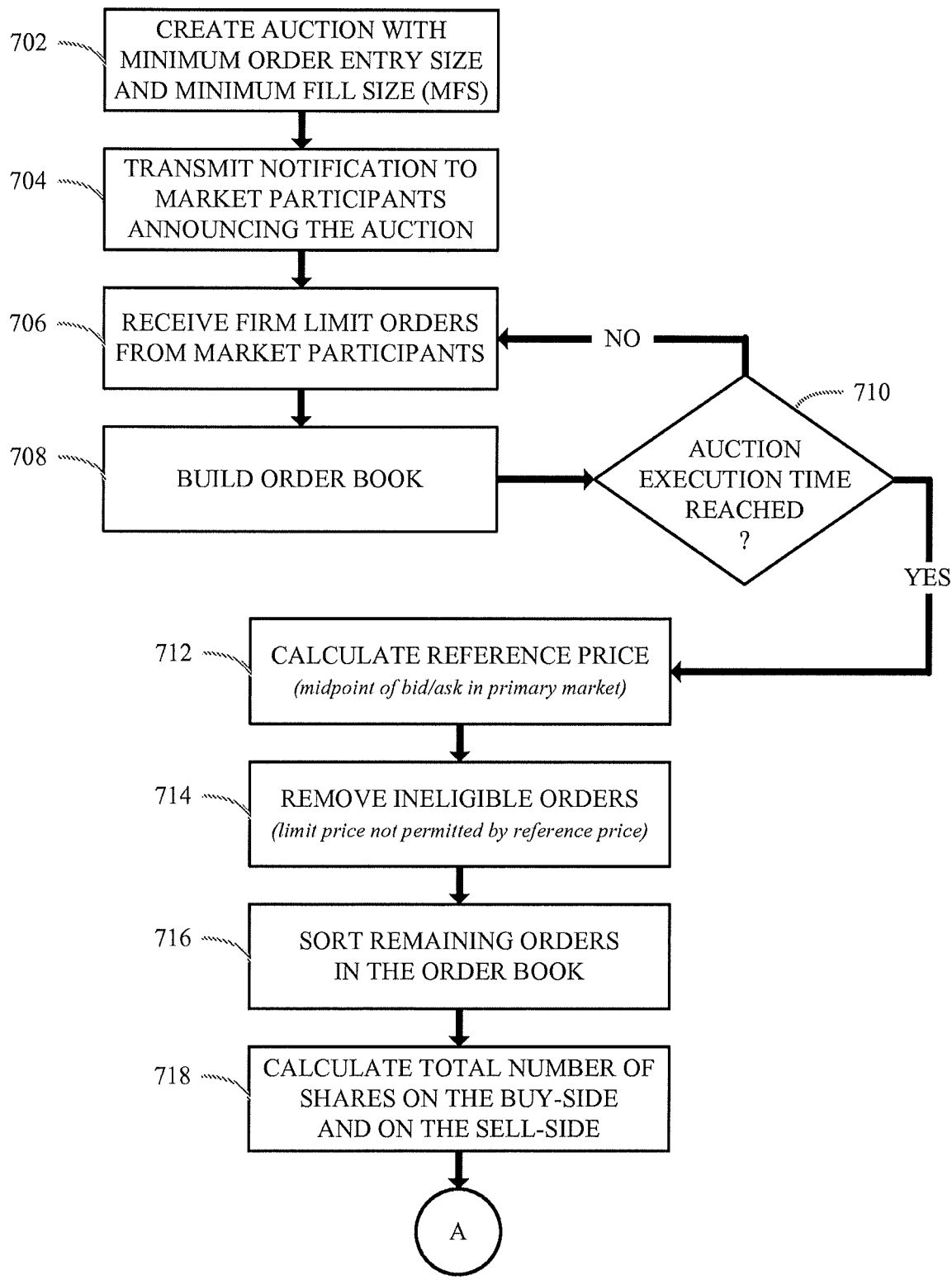
FIGS. 7A-7C are flow diagrams illustrating an embodiment of a method for conducting an auction at a predetermined time, absent a market participant acting as an auction initiator, utilizing a reference price in a primary market.
Figure 7B:
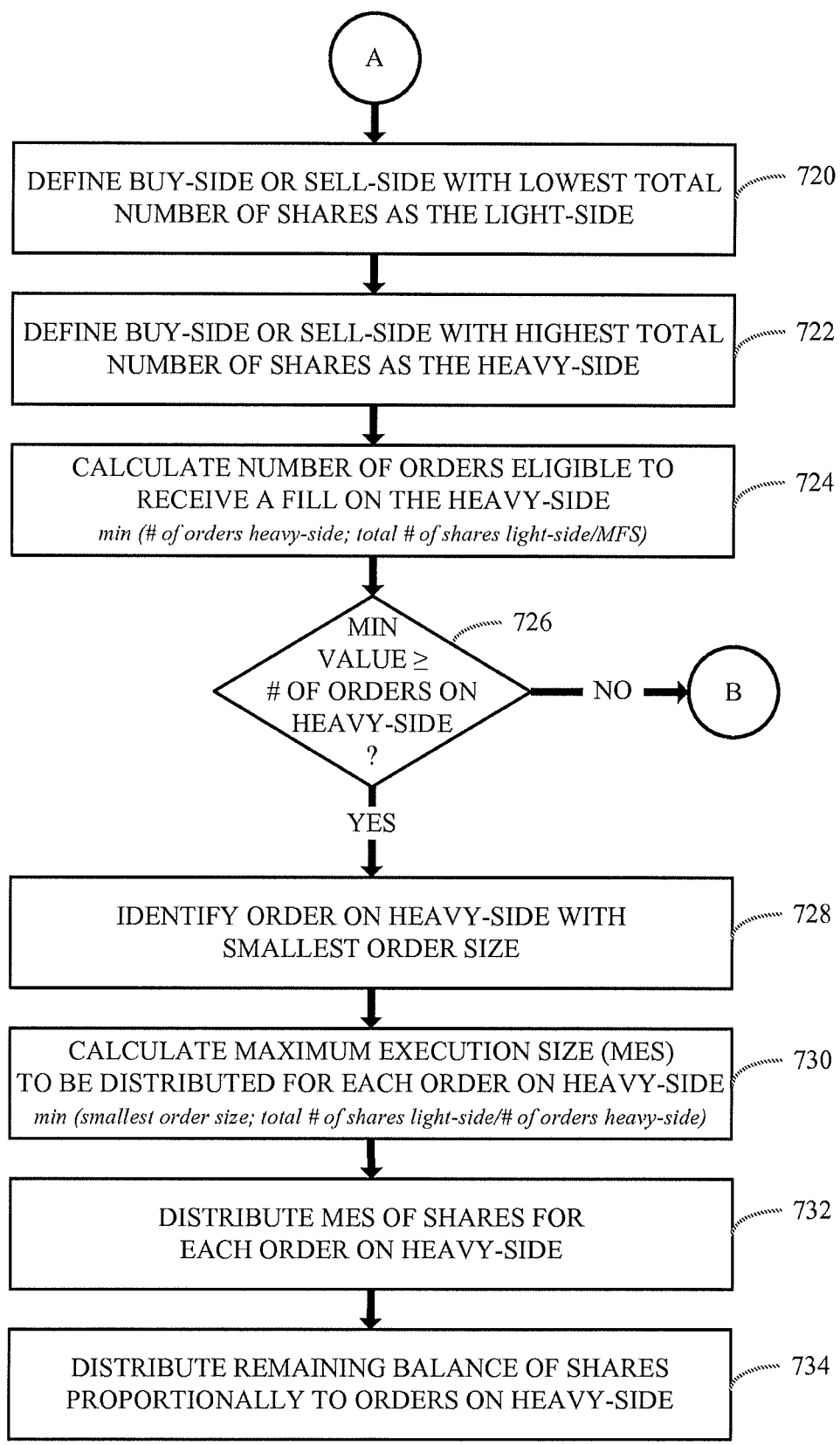
Figure 7C:
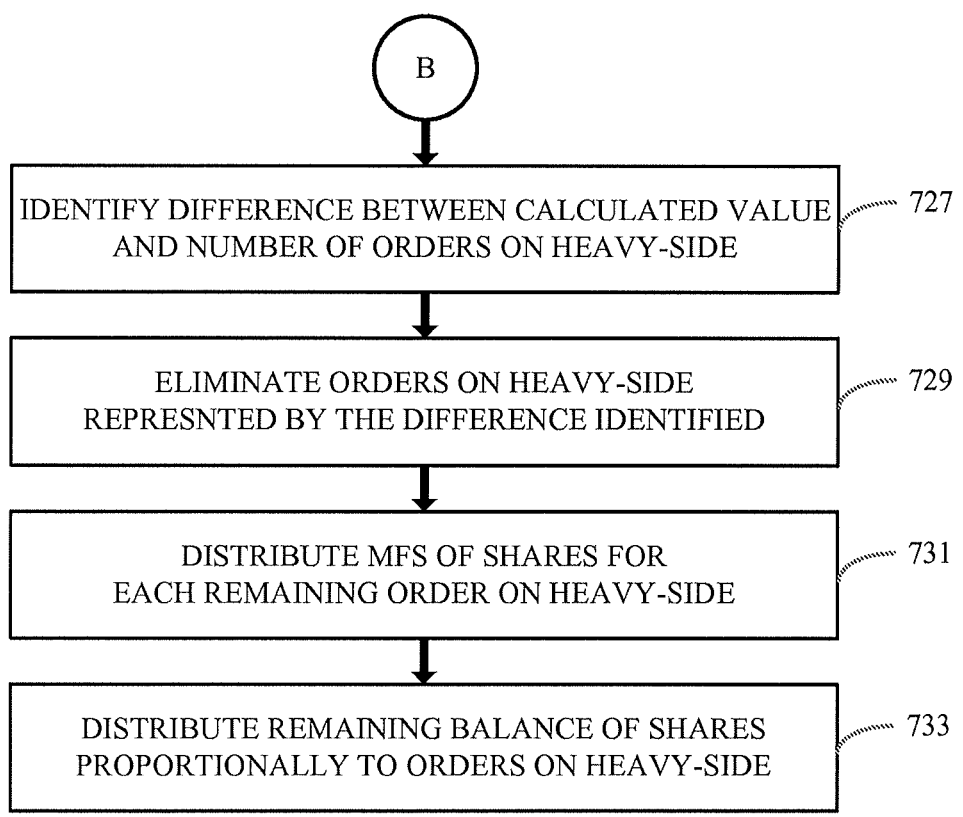

In another embodiment, an auction may not be initiated by a firm limit order received from an auction initiator, but rather may be initiated automatically by trading platform 110 at a pre-determined time (e.g., where a desired level of liquidity is detected to be available in the market) and conducted based on a reference price dictated in the primary market. Allowing an auction to be organized in this manner may provide yet an even higher degree of protection against information leakage—information about the auction other than the time for participating, which may be randomized (as previously discussed), is not necessarily available to market participants. FIGS. 7A-7C are flow diagrams illustrating an embodiment of a method 700 for conducting an auction at a predetermined time, absent a market participant acting as an auction initiator, utilizing a reference price in a primary market. The auction conducted at the pre-determined time may only take into consideration the reference price, which may be calculated as the midpoint bid/ask price in the primary market.

Referring to FIGS. 7A-7C, method 700 may be initiated upon execution of an action or instruction by trading platform 110 to create, at step 702, an auction at a predetermined time. A minimum order entry size and minimum fill size for the auction may be pre-defined, wherein orders failing to meet the minimum order entry size are deemed ineligible and are not permitted to participate in the auction. By way of example and for purposes of illustrating the calculations and corresponding share distributions that follow, the minimum order entry size may be 50,000 and the minimum fill size (MFS) may be 20,000.

A notification may be transmitted, at step 704, announcing creation of the auction to market participants. As firm limit orders are received, at step 706, from market participants, an order book for the auction is built, at step 708. Until a determination is made, at step 710, that an auction time has been reached, orders from market participants continue to be received, at step 706, and entered, at step 708, into the order book. When the auction time is reached, the reference price may be calculated, at step 712, and ineligible orders may be removed, at step 714, from the order book. An order may be deemed ineligible, for example, if the limit price associated with a sell order is higher than a reference price or if the limit price associated with a buy order is lower than a reference price.

FIG. 8A illustrates an order book that may be built from buy and sell orders received from market participants for the auction. Referring to the order book illustrated in FIG. 8A, buy orders are received from market participants "ABC", "DEF", "GHI" and "JKL" and sell orders are received from market participants "MLN", "OPQ", "RST", "UVW" and "XYZ", wherein a corresponding order size (designated by the label "Quantity"), an order time (designated by the label "order n°") and an order price (designated by the labels "Bid" or "Ask") are identified for orders received from each of the foregoing market participants. Although an order price is provided for in the order book, as illustrated in FIG. 8A, it may only be used as a parameter for purposes of determining which orders are to be excluded from the auction when compared to the reference price. For example, if the reference price is identified as $100.10 at the time of auction, the limit order price of $100.00 associated with the buy order received from market participant "JKL" is identified as ineligible and removed from the order book.

After ineligible orders are removed from the order book, the remaining orders in the order book may be sorted, at step 716. FIG. 8B illustrates the order book of FIG. 8A, wherein the ineligible buy order from market participant "JKL" has been removed from the order book and remaining orders from market participants "ABC", "DEF" and "GHI" on the buy-side and market participants "MLN", "OPQ", "RST", "UVW" and "XYZ" on the sell-side are sorted by their size and time. In one embodiment, orders may be sorted first by their size and then secondarily by their time.

Once orders are sorted in the order book, method 700 may then proceed to determine the minimum size that all eligible participants in the auction will receive. In order to do so, first the total number of shares available on the buy-side and the total number of shares available on the sell-side are calculated, at step 718, to identify which side has the lowest and which side has the highest total number of shares to be bought or sold. The side with the lowest total number of shares to be bought or sold is defined, at step 720, to be the "light-side" and the side with the highest total number of shares to be bought or sold is defined, at step 722, to be the "heavy-side". Referring to the order book illustrated in FIG. 8B, the total number of shares on the buy-side is 370,000 and the total number of shares on the sell-side is 700,000. Accordingly, the buy-side is defined as the "light-side" and the sell-side is defined as the "heavy-side" in the present example.

Orders received from market participants associated with the light-side will be completely filled. While the number of orders that will be filled on the heavy-side, along with the number of shares that will be distributed for each order qualified for a fill, must be calculated. The total number of shares on the light-side may be used to calculate, at step 724, the number of orders out of the total number of orders on the heavy-side that are eligible to receive a fill. The calculation, at step 724, comprises dividing the total number of shares on the light-side by the predefined MFS, wherein the value yielded by this computation is compared to the actual number of orders on the heavy-side. Thereafter, a determination is made, at step 726, whether the value yielded by the foregoing computation is greater than or equal to the actual number of orders on the heavy-side. In this particular example, the value yielded by the foregoing computation (i.e., 370,000/20,000=18.5) is greater than the actual number of orders on the heavy-side (i.e., 5). Accordingly, all 5 orders identified on the heavy-side, as represented in the order book illustrated in FIG. 5B, will receive a fill.

After the number of orders qualified for a fill on the heavy-side is determined, the maximum execution size (IVIES) to be distributed per order on the heavy-side may be calculated. In doing so, method 700 may first identify, at step 728, the order-on the heavy-side with the smallest order size. Referring to the order book illustrated in FIG. 8B, the order associated with market participant UVW has the smallest order size (i.e., 50,000) on the heavy-side. Thereafter, the MES may be calculated, at step 730, by dividing the total number of shares on the light-side by the number of orders on the heavy-side qualified to receive a fill, wherein the value yielded by this computation (i.e., 370,000/5=74,000) is compared to the smallest order size on the heavy-side (i.e., 50,000), as identified at step 728. The minimum of these two values, in this particular example 50,000, is selected as the IVIES and is distributed, at step 732, to each order on the heavy-side, as reflected in the order book illustrated in FIG. 8C.

Therefore, each of the 5 orders on the heavy-side eligible to receive a fill receives 50,000 shares, thereby resulting in 250,000 shares initially being distributed. The remaining balance of shares (i.e., 370,000−250,000=120,000) may then be distributed proportionally, at step 734, to orders on the heavy-side that have not yet been completely filled, as reflected in the order book illustrated in FIG. 8D. For clarity, FIGS. 8C and 8D are order books illustrating, respectively, an initial and final distribution of shares in accordance with method 700.

In the alternative, if the determination made, at step 726, confirms that the value yielded by the computation, at step 724, is less than the actual number of orders on the heavy-side, one or more orders on the heavy-side may be eliminated to match the number of orders permitted to receive a fill. The difference between the value yielded by the computation and the number of orders on the heavy-side may be identified, at step 727, so that the appropriate number of orders on the heavy-side is eliminated, at step 729. For example, if the value yielded by the computation was 4, rather than 5 as in the previous example, then one order on the heavy-side would have to be eliminated. The order selected for elimination may be based on a size/time priority principal, wherein the order represented by the smallest order size and submitted later in time is eliminated first.

After die appropriate number of orders on the heavy-side is eliminated, at step 729, the predefined MFS (i.e., 20,000) is distributed, at step 731, to each of the remaining orders on the heavy-side. Therefore, each of the 4 orders remaining on the heavy-side eligible to receive a fill receives 20,000 shares, thereby resulting in 80,000 shares initially being distributed. The remaining balance of shares (i.e., 370,000−80,000=290,000) may then be distributed proportionally, at step 733, to orders on the heavy-side that have not yet been completely filled.

It should be noted that the sequence of operations described in conjunction with methods 200, 400, 600 and 700 may be different from that illustrated, respectively, in corresponding FIGS. 2A-2B, 4, 6 and 7A-7C. For example, the operations at step 208 illustrated in method 200 of FIGS. 2A-2B may be executed before the operation of step 204.

Similarly, the operations at step 412 illustrated in method 400 of FIG. 4 may be executed before the operation of step 408.

Figure 9:
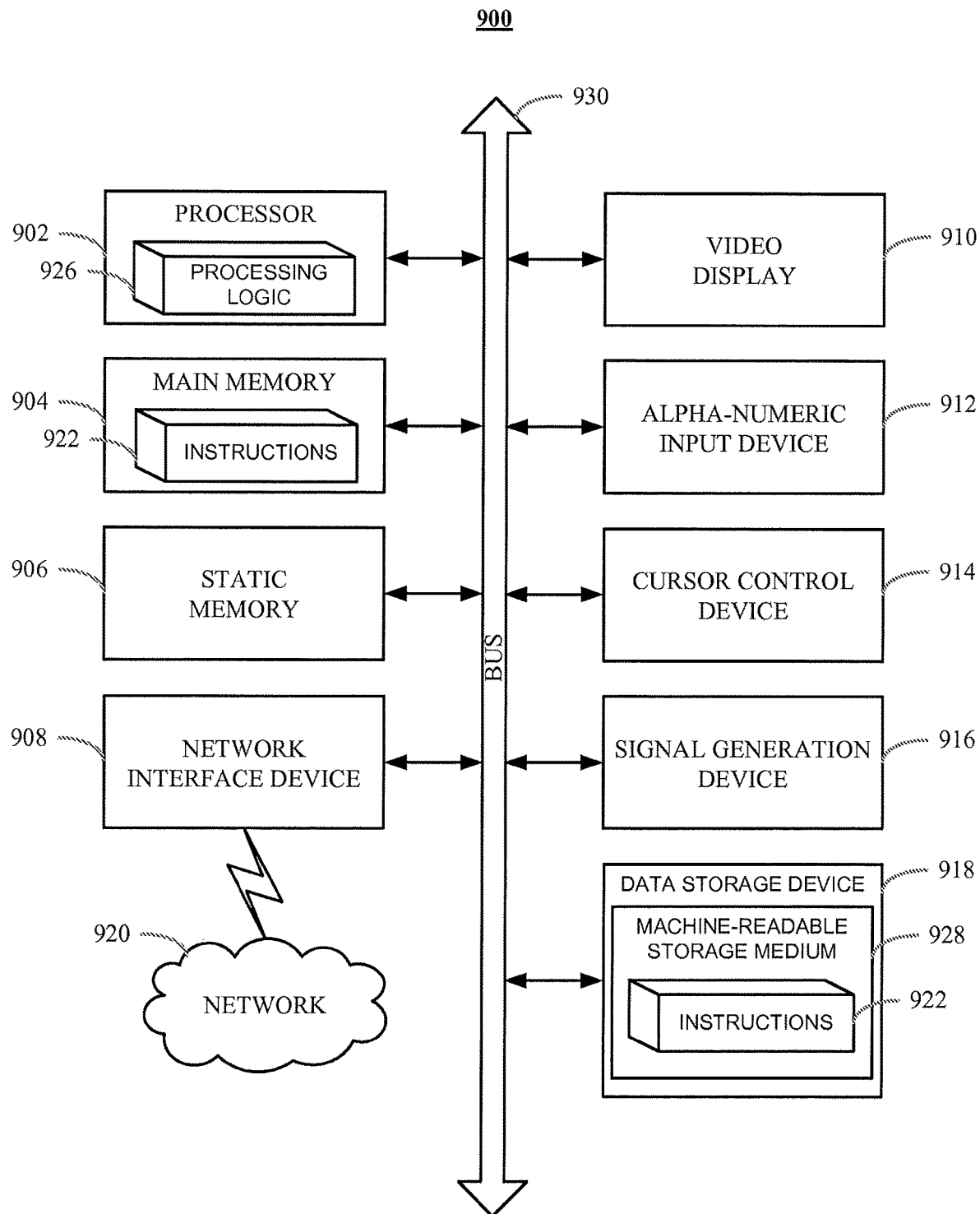
FIG. 9 illustrates a diagrammatic representation of a machine in the exemplary form of a computer system.

FIG. 9 illustrates a diagrammatic representation of a machine in the exemplary form of a computer system 900 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 may be comprised of a processing device 902, a main memory 904 (e.g., read-only memory (ROM), flash memory, dynamic random access memory (DRAM) (such as synchronous DRAM (SDRAM) or Rambus DRAM (RDRAM), etc.), a static memory 906 (e.g., flash memory, static random access memory (SRAM), etc.), and a data storage device 918, which communicate with each other via a bus 930.

Processing device 902 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. Processing device 902 is configured to execute processing logic 926 for performing the operations and steps discussed herein.

Computer system 900 may further include a network interface device 908. Computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 916 (e.g., a speaker).

Data storage device 918 may include a machine-readable storage medium (or more specifically a computer-readable storage medium) 928 having one or more sets of instructions (e.g., software 922) embodying any one or more of the methodologies of functions described herein. For example, software 922 may store instructions to conduct an auction for block order trading. Software 922 may also reside, completely or at least partially, within main memory 904 and/or within processing device 902 during execution thereof by computer system 900; main memory 904 and processing device 902 also constituting machine-readable storage media. Software 922 may further be transmitted or received over a network 920 via network interface device 908.

Machine-readable storage medium 928 may also be used to store instructions to conduct an auction for block order trading. While machine-readable storage medium 928 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present disclosure. The term "machine-readable storage medium" shall accordingly be taken to include, but not be limited to, solid-state memories, and optical and magnetic media.

Whereas many alterations and modifications of the present disclosure will no doubt become apparent to a person of ordinary skill in the art after having read the foregoing description, it is to be understood that any particular embodiment described and shown by way of illustration is in no way intended to be considered limiting. Therefore, references to details of various embodiments are not intended to limit the scope of the claims, which in themselves recite only those features regarded as the disclosure.

The invention claimed is:

1. A method comprising:
   initiating an online auction, the online auction having a duration that is unknown to market participants;
   receiving one or more firm limit orders from one or more computer devices associated with the market participants;
   storing, in an order book, a first portion of the one or more firm limit orders, the first portion received during the duration of the online auction;
   preventing storage, in the order book, of a second portion of the one or more firm limit orders, the second portion received after the duration of the online auction;
   removing, from the order book, one or more ineligible firm limit orders from the first portion based on a reference price; and
   executing a remainder of the firm limit orders from the first portion stored in the order book.

2. The method of claim 1, wherein the one or more firm limit orders comprise a dark order, the dark order not being visible to a broader market.

3. The method of claim 1, wherein the one or more ineligible firm limit orders have a price that is higher than the reference price.

4. The method of claim 1, wherein the one or more ineligible firm limit orders have a price that is lower than the reference price.

5. The method of claim 1, wherein the reference price is calculated from market data received during the duration of the online auction.

6. The method of claim 1, wherein the online auction is initiated at a pre-determined time that is unknown to the market participants.

7. The method of claim 1, further comprising:
   determining, by a randomized timer, a randomized time for the duration of the online auction.

8. The method of claim 1, further comprising:
transmitting a notification of the online auction to the one or more computer devices, the notification excluding information as to the duration of the online auction.

9. The method of claim 1, further comprising:
designating a buy-side or a sell-side as a light-side or a heavy-side in the online auction, wherein the buy-side or the sell-side with the lowest total number of shares is defined as the light-side, and wherein the buy-side or the sell-side with the highest total number of shares is defined as the heavy-side.

10. The method of claim 9, further comprising:
calculating a maximum execution size, the maximum execution size representative of a number of shares to be distributed to each firm limit order on the heavy-side.

11. The method of claim 10, wherein the calculation comprises comparing two values, a first value representative of the smallest firm limit order size on the heavy-side and a second value representative of a computational value yielded by dividing the total number of shares on the light-side by the number of firm limit orders on the heavy-side, the maximum execution size being a minimum of the first value and the second value.

12. The method of claim 10, wherein a first distribution of shares is distributed to each firm limit order on the heavy-side, each firm limit order on the heavy-side receiving the first distribution of shares equal to the maximum execution size calculated.

13. The method of claim 12, wherein a second distribution of shares is distributed to each firm limit order on the heavy-side that has not been completely filled, the second distribution representative of a remaining balance of shares on the light-side after the first distribution of shares to each firm limit order on the heavy-side, the remaining balance of shares being distributed proportionally to each firm limit order on the heavy-side that has not been completely filled by the first distribution of shares.

14. The method of claim 9, further comprising calculating a number of firm limit orders eligible to receive a fill on the heavy-side.

15. The method of claim 14, wherein the calculation comprises comparing two values, a first value representative of a number of firm limit orders on the heavy-side and a second value representative of a computational value yielded by dividing the total number of shares on the light-side by a minimum fill size, the number of firm limit orders eligible to receive a fill on the heavy-side being a minimum of the first value and the second value.

16. The method of claim 15, wherein one or more firm limit orders on the heavy-side are eliminated when the minimum of the first value and the second value is less than the number of firm limit orders on the heavy-side.

17. The method of claim 16, wherein a first distribution of shares is distributed to each firm limit order remaining on the heavy-side after the one or more firm limit orders on the heavy-side is eliminated, each firm limit order remaining on the heavy-side receiving the first distribution of shares equal to the minimum fill size.

18. The method of claim 17, wherein a second distribution of shares is distributed to each firm limit order remaining on the heavy-side that has not been completely filled, the second distribution representative of a remaining balance of shares on the light-side after the first distribution of shares to each firm limit order remaining on the heavy-side, the remaining balance of shares being distributed proportionally to each firm limit order remaining on the heavy-side that has not been completely filled by the first distribution of shares.

* * * * *